United States Patent [19]

Alassoeur et al.

[11] Patent Number: 5,544,805
[45] Date of Patent: Aug. 13, 1996

[54] METHOD OF PRODUCING A FIBRE-REINFORCED METALLIC CIRCULAR PART

[75] Inventors: Philippe L. A. Alassoeur, Le Vesinet; André C. F. Collot, Mennecy; Xavier J. M. A. Guyonnet, St Fargeau Ponthierry; Gilles C. C. Klein, Mery S/Oise; Ludovic E. C. Molliex, Paris, all of France

[73] Assignee: Societe National d'Etude et de Construction de Moteurs d'Aviation "SNECMA", Paris, France

[21] Appl. No.: 386,775

[22] Filed: Feb. 10, 1995

[30] Foreign Application Priority Data

Feb. 10, 1994 [FR] France .................. 94 01490

[51] Int. Cl.⁶ .................. B23K 20/00; B21K 3/00
[52] U.S. Cl. .................. 228/190; 228/265; 228/160; 228/186
[58] Field of Search .................. 228/175, 190, 228/160, 186, 193, 265; 29/889.2

[56] References Cited

U.S. PATENT DOCUMENTS

| | | |
|---|---|---|
| 4,781,669 | 11/1988 | Piramoon . |
| 5,098,011 | 3/1992 | Runyan .................. 228/235.1 |
| 5,184,769 | 2/1993 | Moracz et al. . |
| 5,289,967 | 3/1994 | Bampton et al. .................. 228/190 |
| 5,470,524 | 11/1995 | Krueger et al. .................. 419/5 |

FOREIGN PATENT DOCUMENTS

| | | |
|---|---|---|
| 049629A3 | 6/1992 | European Pat. Off. . |
| 2607071 | 5/1988 | France . |
| 2666262 | 3/1992 | France . |

*Primary Examiner*—Samuel M. Heinrich
*Attorney, Agent, or Firm*—Oblon, Spivak, McClelland, Maier & Neustadt, P.C.

[57] ABSTRACT

A method of producing a fibre-reinforced metallic circular part having a central hollow, wherein the reinforcing fibres are disposed in the part in the vicinity of the hollow, comprises providing an annular metallic blank with a channel-sectioned groove opening towards the axis of the blank, placing uncompressed concentric layers of the reinforcing fibres and additional metal alternately in the groove followed by a more rigid expansion ring, evacuating the groove and sealing it by a deformable closure member which covers the groove, placing this assembly in an autoclave and subjecting it to a temperature and pressure sufficient to effect superplastic forging of the layers of additional metal whereby the fibre layers and the additional metal layers are compressed and welded to the blank in a single operation, and machining the resulting assembly to obtain the required shaped part.

20 Claims, 1 Drawing Sheet

METHOD OF PRODUCING A FIBRE-REINFORCED METALLIC CIRCULAR PART

BACKGROUND OF THE INVENTION

1. Field of the Invention

The invention relates to a method of producing a circular metal part which has a central hollow and is reinforced with fibers in the vicinity of this hollow, and is particularly concerned with the production of such parts for use in making rotors having a high strength/mass ratio, such as the rotors of turbo-machines used in aeronautics.

2. Summary of the Prior Art

Turbo-machine rotors are generally symmetrical about their axis of rotation and include, either on their periphery or on their side, a plurality of blades for operation in a compressor or a turbine. These rotors generally revolve at high speed, and are subjected to considerable stresses originating mainly from centrifugal force, but also from the vibrations of the machine and the accidental ingestion of foreign bodies.

The design of these rotors is a compromise between aerodynamic or hydrodynamic performance, strength, and mass. In order to improve the strength/mass ratio, it is known to reinforce such rotors by rings or bands made of stronger materials and having a greater modulus of elasticity, also termed Young's modulus.

Rotor reinforcement rings are known having a fibrous structure, especially fibers of silicon carbide, boron carbide, or other high strength material, wherein the fibers are embedded in a metallic matrix. French Patent 2607071 discloses an example in which silicon carbide (SIC) fibers are assembled into a helical strip or preform, and another strip, made of the material of the matrix, is interposed between the turns of the fiber strip. The assembly is pressed at high temperature so that the pressure forces diffuse the matrix material between the fibers to ensure the cohesion of the assembly.

European Patent 0490629 discloses another example in which the preforms are each made using a single fiber wound in a plane spiral. This process achieves a remarkable uniformity in the radius of curvature of the fiber, for an improved ring strength.

It must be noted, however, that these techniques require a pressing in an axial direction, which tends to cause undulation of the fibers and thus reduces their ability to withstand centrifugal stress.

Also known from French patent 2666262 is a process in which a composite band of fibers and metal matrix is spirally wound inside a metal ring, and then welded to it by isostatic or radial pressure while hot in an autoclave or with the aid of a thermal expansion mandrel.

The advantage of this process is that the reinforcement fibers are well stretched, which prevents any corrugation and improves their ability to withstand centrifugal stress.

However, all of these known processes suffer from the drawback of imposing two thermal cycles on the reinforcement fibers, namely compression of the fibers with the metal of the matrix to obtain the composite layers, then diffusion welding of the composite layers, which increases the degradation of the fibers. For example, silicon carbide SiC, which is often used for making reinforcement fibers, may react with the metal of the matrix at high temperature. To reduce this phenomenon, the fibers may be covered with a layer of carbon, but this layer itself diffuses into the metal of the matrix and alters the metallurgical structure of the latter. The reaction of the material of the fiber with the matrix is thus only delayed.

SUMMARY OF THE INVENTION

The invention proposes to overcome this problem by providing a process wherein the reinforcement fibers and the additional metal constituting the matrix are jointly compressed and welded to the circular part to be reinforced in a single operation, this being effected by exerting an outward radial compression at the superplastic forging temperature of the additional metal which forms the metallic matrix.

More precisely, the invention provides a method of producing a fiber-reinforced metallic circular part having a central hollow and wherein the reinforcing fibers are disposed in the part in the vicinity of the hollow, comprising the following principal steps:

providing an annular metallic blank containing a channel-sectioned circular groove opening towards the axis of the blank and into the central hollow of the blank;

placing uncompressed concentric layers of the reinforcing fibers and additional metal alternately in the groove, preferably followed by an extra thickness of additional metal without fibers;

placing in the mouth of the groove a radial expansion ring which is made of a material more rigid than the additional metal and which is slidable between the side walls of the groove;

covering the groove with a metallic closure member capable of being deformed in the manner of a membrane under the action of temperature and pressure;

placing the groove under vacuum and welding the closure member to the blank, preferably by electron beam welding, to hermetically seal the groove;

placing the assembly in an autoclave and subjecting it to a temperature and pressure sufficient to effect superplastic forging of the additional metal, the pressure in the autoclave being increased to cater for the stiffness of the expansion ring, such that the fiber layers and the additional metal layers are compressed together and welded to the blank by superplastic forging in a single operation; and removing the ring and machining the resulting assembly to obtain the required part.

The blank has side walls and a thick and rigid peripheral wall. The closure member, on the other hand, is thin, with the ratio of its thickness to the groove width and the ratio of its thickness to the thickness of the blank walls being low. The ring is made of a material which retains a rigidity which is just sufficient during the compression and welding operation.

Thus, during the heating and compression in the autoclave, the closure member becomes deformed in the manner of a membrane, enters the groove, and pushes on the ring so that it undergoes radial expansion and slides between the side walls of the groove. The ring thus compresses the various layers of fibers and additional metal between its outer surface and the bottom of the groove, thus ensuring diffusion of the metal between the fibers and its diffusion welding to the blank.

Preferably the layers of fibers and additional metal are placed in the groove as preforms cut to the required lengths from a ribbon comprising a support sheet of the additional metal and a fabric in which the reinforcing fibers form the warp threads applied to one face of the support. Each preform will be cut from this ribbon to a length equal to the circumference of the circle which the preform will describe when placed in the groove, and the preforms are placed so that the cut lines of successive preforms are offset so as to evenly distribute the cut lines around the groove.

In a preferred embodiment, the width of the fiber fabric is less than that of the support, and the weft threads protrude from the fabric at each edge and are gripped between the support and two lateral strips of additional metal which are resistance welded to the support. This low cost method of production makes it possible to obtain preforms consisting only of metal and fiber, thus excluding any organic binder which would have to be eliminated afterwards.

The main advantage of the invention is to impose only a single thermal cycle on the fibers in contact with the matrix metal, thereby reducing the degradation of the said fibers.

Another advantage of the invention is that the pressure exerted on the fibers is radial and outward, which prevents any waviness of the fibers which could appear if an axial pressure is exerted. The strength of the fibers is thus improved because the fibers assume the shape of a perfect circle.

One problem to be overcome in realising the invention was to be able to exert this radial and outward pressure in spite of the substantial reduction occuring in the total volume occupied by the fibers and additional metal during compression, and to make the compression uniform. This is solved by exerting the pressure in an autoclave through a closure member which becomes deformed in the manner of a membrane and pushes on the more rigid radial expansion ring.

The invention should not be confused with that which is disclosed in the aforementioned French patent 2666262, being distinguished therefrom in particular by:

the compression and welding of the fibers and the additional metal in the same operation;

the use of a closure member with a lower thickness to length ratio so that the member becomes deformed in the manner of a membrane during the compression and welding operation, this member disappearing altogether in the course of the machining of the finished part;

the use of the radial expansion ring which slides between the side walls of the groove;

the use of a deeper groove and the placement of uncompressed layers of fibers and additional metal into the groove which do not form a composite material at this stage; and, the use of the additional metal to support the fibers, thus avoiding introducing a separate support, which would necessarily take up volume, and thereby allowing the density of the fibers to be increased.

The invention will now be further described in the context of a detailed embodiment, given by way of non-limitative example, and with reference to the attached drawings.

DESCRIPTION OF THE PREFERRED EMBODIMENT

Figure 1:
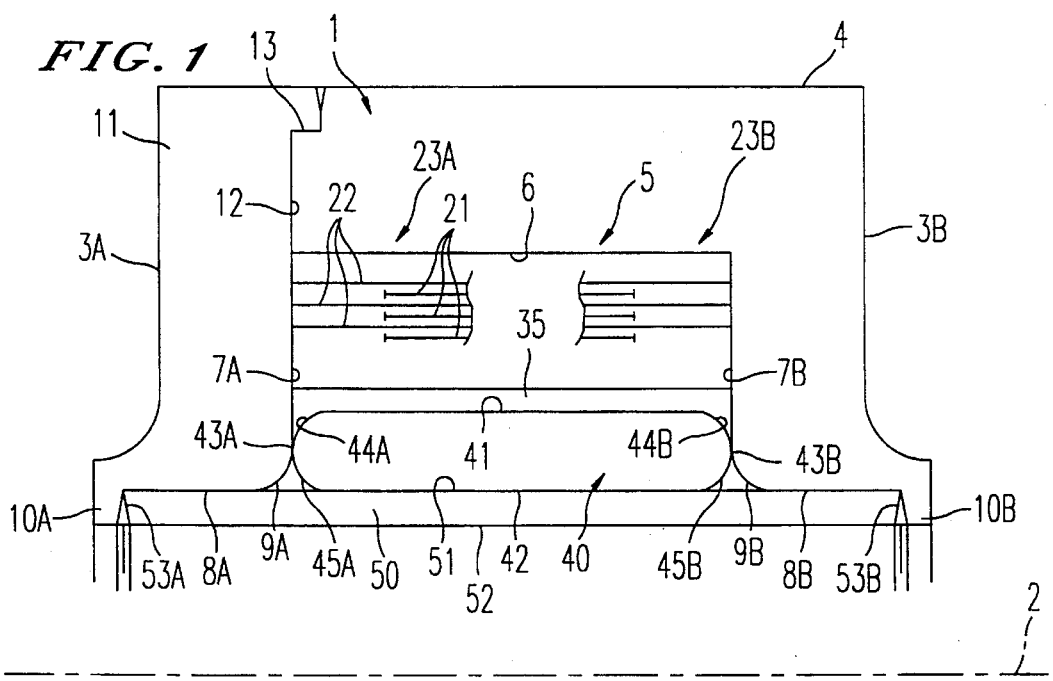
FIG. 1 shows a diagrammatic axial half section of the assembly before the compression and welding operation in a preferred embodiment of the method in accordance with the invention.

With reference to FIG. 1, an annular metallic blank 1 is shown which is generally symmetrical in shape around its geometric axis 2. This blank is bounded laterally by two radial surfaces 3A and 3B, and outwardly by a cylindrical surface 4. The blank 1 also includes a circular groove 5 which is centered on the axis 2, and has its mouth opening towards the axis 2. The groove 5 is channel-sectioned and is bounded radially by a bottom 6 formed by a cylindrical surface coaxial with the axis 2, and axially by two annular planar walls 7A and 7B which are perpendicular to the axis 2. These surfaces 7A and 7B merge with cylindrical surfaces 8A and 8B respectively through rounded portions 9A and 9B of sufficient radius. These surfaces 8A and 8B thus bound the blank 1 inwardly, and between these surfaces and the lateral surfaces 3A and 3B the blank defines shoulders 10A and 10B disposed laterally outwardly of the said surfaces 8A and 8B.

So as to allow access to the whole of the groove 5 by a single axial movement, a flank portion 11 of the blank 1 is removable. Although not essential, it is preferred that the flank portion 11 adjoins the remainder of the blank 1 at a contact surface 12 forming a radial extension of one of the walls 7A, 7B defining the sides of the groove 5 as shown. The flank portion 11 is centered relative to the remainder of the blank by means of an offset portion 13 of the contact surface 12 which is concentric with the axis 2.

Layers of fibers 21 and sheets of additional metal 22 are disposed alternately in the groove 5 so that each layer of fibers 21 is separated from the adjacent layers by a sheet 22 of additional metal. Each fiber 21 defines a cut circle centered on the axis 2 and situated in a plane radial to this axis, the fiber 21 having a length equal to, or slightly shorter than, the circumference of the circle which it defines before compression. In contrast to the sheets of additional metal 22, the fibers 21 are not arranged across the entire width of the groove 5, and thus there are therefore non-fibrous zones 23A and 23B extending between the edges of the fiber layers and the side walls 7A and 7B of the groove.

Figure 2:
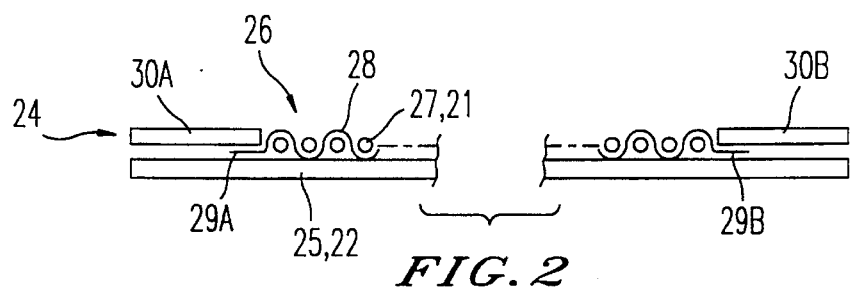
FIG. 2 shows a sectional view of a preform consisting of a layer of fibers and a layer of metal as used in forming the assembly shown in FIG. 1.

Referring now to FIG. 2, in this preferred embodiment layers of fiber 21 and additional metal 22 are placed in the groove as preforms 24 produced as follows. A foil ribbon of the additional metal 22 is used to form a support 25 having a width which is equal to, or slightly less than, that of the groove 5. A strip of fabric 26 is then applied to one face of this metal support ribbon 25, the warp threads 27 of the fabric being constituted by the reinforcing fibers 21 and the weft threads 28 preferably being formed by small strips of the same material as the support 25. The weft threads 28 pass alternately above and below the warp threads 27 to ensure their cohesion, and the ends of these weft threads 28 protrude from the edges of the fabric 26 as extensions 29A and 29B which are held between the support 25 and two lateral strips 30A and 30B secured firmly to the support 25. The lateral strips 30A and 30B are preferably made of the same material as the support 25 and are preferably secured to it by spot welding or some other resistance welding method. These strips 30A and 30B extend from the edges of the fabric 26 to the edges of the support 25, on both sides of the fabric 26.

It will thus be understood that these strips 30A and 30B make it possible to hold the fibers 21 on the additional metal foil without any organic binder, and at the same time to fill up with additional metal the spaces resulting from the absence of fibers in the zones 23A and 23B.

From the ribbon thus assembled, portions are cut to form preforms of required lengths, i.e. in each case equal to the circumference of the circle to be defined by the preform when it is placed in the groove 5. These preforms are then placed in the groove 5 so that the cut lines of the preforms are evenly distributed around the circumference of the groove 5, the cut lines of successive layers being substantially diametrically opposite. For example, if there are 36 layers, the cut lines of successive layers will be spaced according to the series 0°, 190°, 20°, 210°, 40°, etc.; i.e. a staggering of 190° between consecutive layers, and of 20° between alternate layers.

Now referring back to FIG. 1, an extra thickness 35 of additional metal is placed in the groove 5 radially inwardly of and against the layers of fibers 21 and additional metal 22. This extra thickness 35 has the shape of a cylindrical wall coaxial with the axis 2 and having an axial length which is equal to, or slightly lower than, the width of the groove 5. This layer 35 will be preferably produced by placing in the groove 5 sheets of the additional metal without any layers of fibers 21.

A radial expansion ring 40 is disposed at the mouth of the groove 5, this ring 40 having an outer cylindrical surface 41 which comes in contact with the extra thickness 35 of the additional metal, and an inner cylindrical surface 42 which has a diameter equal to that of the surfaces 8A and 8B and is therefore situated in the same plane as these surfaces 8A and 8B. The ring 40 also has two lateral plane surfaces 43A and 43B which are radial to the axis 2 and which are arranged to slide radially with sufficient clearance between the side walls 7A and 7B of the groove when the ring expands. These lateral surfaces 43A and 43B merge with the outer surface 41 through rounded portions 44A and 44B respectively, and similarly merge with the inner surface 42 through rounded portions 45A and 45B respectively.

Finally, the groove 5 is closed by a closure member 50 formed by a thin walled cylinder having an outer surface 51 butting against the inner surfaces 8A and 8B of the blank 1, and two lateral ends 53A and 53B reaching to the shoulders 10A and 10B.

The assembly is preferably carried out in the following manner:

placing in the groove 5, against the bottom 6, several sheets of additional metal cut to length;

placing in the groove 5 the preforms 24 of fiber 21 and additional metal 22;

inserting the ring 40 into the groove 5;

inserting further layers of additional metal into the groove between the ring 40 and the fiber and metal preforms 24 to form the extra thickness 35;

introducing the closure member 50 until its end 53B reaches to the shoulder 10B;

fitting the flank portion 11 in place.

To facilitate the insertion of the last sheets, the space between the surfaces 41 and 6 will be arranged to be from 3% to 5% greater than the sum of the thickness of the layers of fibers 21 and the layers of additional metal 22, including the extra thickness 35, which are to be accommodated.

The assembly is then placed in an evacuated enclosure, and the operator will carry out electron beam welding of the flank portion 11 to the remainder of the blank 1 along the line of intersection between the contacting surfaces 12 and the outer surface 4 of the blank, and will also weld the ends 53A and 53B of the closure member 50 to the shoulders 10A and 10B respectively of the blank 1. The assembly thus forms a sealed container, in which the inside of the groove 5 is void of air.

This assembly is then placed in an autoclave and raised progressively to the temperature and pressure conditions necessary to achieve the superplastic forging of the layers of additional metal 22.

Under the combined effect of the increase of the plasticity of the material as the temperature rises, and the pressure exerted radially on the inner surface 52 of the closure member 50, the latter deforms into the spaces present between the rounded portions 9A and 45A and the rounded portions 9B and 45B, and comes to bear on these rounded portions. So as not to tear the closure member 50, the radius of the rounded portions should be at least equal to the thickness of the member 50.

The pressure in the autoclave is transmitted by the closure member 50 to the inner surface 42 of the ring 40, and under the action of this pressure the ring 40 expands radially, sliding between the side walls 7A and 7B of the groove 5 and compressing against the bottom 6 of the groove 5 the various layers of fiber 21 and additional metal 22, as well as the sheets of additional metal forming the extra thickness 35. So as to favour this radially outward deformation, the walls of the blank 1 surrounding the groove 5 are thick and solid, whereas the closure member is thin and easily deformable in the manner of a membrane. In practice, the thickness of the blank 1 between its outer surface 4 and the bottom 6 of the groove 5 should not be less than 5 times the thickness of the member 50.

This compression brings about the penetration of the additional metal between the fibers by superplastic forging, the filling up of all the empty spaces, the welding of the additional metal embedding the fibers to the walls 6, 7A and 7B of the groove 5, as well as a substantial reduction in the apparent volume of the fibers and the additional metal. The diameter of the ring 40 accordingly increases under the action of the pressure in the autoclave being exerted on its inner surface through the membrane 50.

This member 50 becomes deformed and enters the groove 5 while maintaining the sealing of the groove.

It is important that the ring 40 should remain cylindrical during its expansion, so as to ensure uniform compression of the fibers 21 and of the additional metal 22, despite the expansion tending to be greater at the center rather than near the surfaces 7A and 7B at the sides of the groove 5 as a consequence of the residual stiffness of the member 50. Accordingly, it is preferable that the ratio of the thickness of the ring to fits axial length is not lower than 0.15, this thickness being measured between the surfaces 41 and 42, and the length between the surfaces 43A and 43B of the ring 40. Also, the material chosen for the ring will preferably have an elastic stretch limit and a stretch limit before breaking respectively below and above the actual stretching of the ring which occurs during the superplastic compression and welding of the layers of fibers and additional metal 22.

The ring 40 may also be advantageously covered with a passivating coating, for example alumina $Al_2O_3$, or yttrin $Y_2O_3$, so that it does not weld to the other parts.

The ring 40 may however be dispensed with when the ratio of the thickness to the width of the fibrous zone is small.

Figure 3:
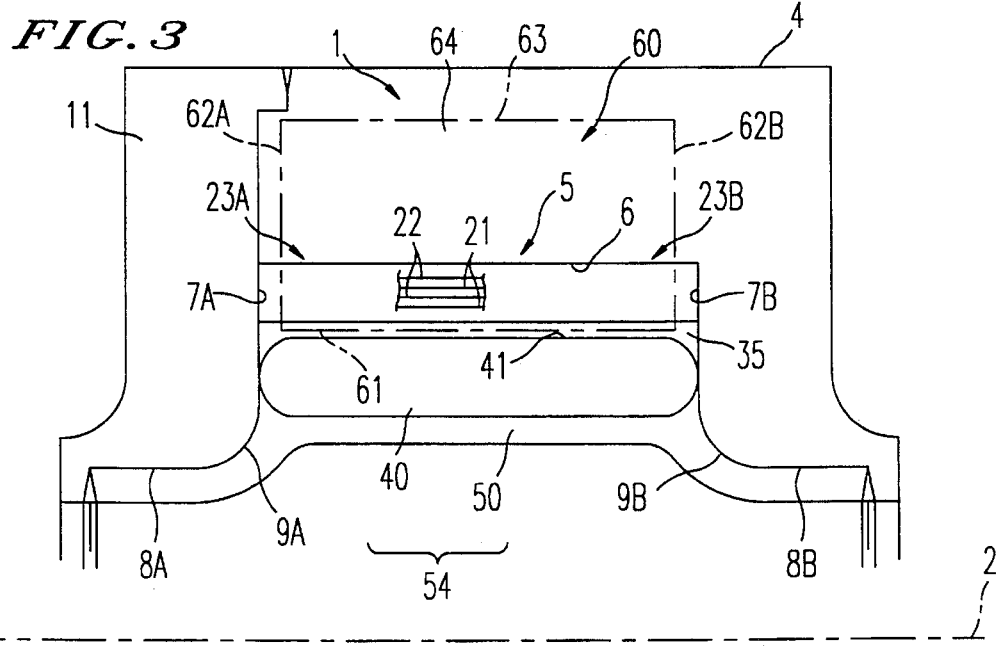
FIG. 3 is a view similar to FIG. 1 but showing the assembly after the compacting and welding operation, and also indicating the outline shape of the finished part machined from the assembly.

FIG. 3 shows the assembly after the compression and the welding of the layers of fibers 21 and additional metal 22, the diameter of the ring 40 having increased substantially and its surface 43A and 43B slid between the walls 7A and 7B of the groove 5. The closure member 50 remains applied against the ring 40, having rolled over the rounded portions 9A and 9B at the mouth of the groove while being deformed without tearing in the manner of a membrane. To do this, the ratio between the thickness of the member 50 and the width of the groove 5 should preferably be within the range of from 0.05 to 0.15, and the radius of the rounded portions 9A and 9B should be close to the radial displacement of the central part 54 of the member 50, and preferably not less than two thirds of this displacement. Moreover, the length of the bearing surfaces 8A and 8B laterally outward of the rounded portions should preferably not be less than twice the thickness of the closure member so as to reduce the stress exerted on the welds.

In this embodiment, the part 60 to be machined has a rectangular profile, and comprises a cylindrical inner surface 61 coaxial with the axis 2, two planar annular lateral surfaces 62A and 62B radial to the axis 2, and an outer cylindrical surface 63 coaxial with the axis 2.

The inner surface 61 is located in the over-thickness 35 so that the reinforcement fibers 21 are not exposed at this surface 61. The over-thickness 35 will thus have a thickness greater than the thickness of the metal having to remain between the fibers 21 and the inner surface 61 of the machined part 60.

The diameter of the bottom 6 of the groove 5 will be very simply deduced from the mean diameter of the over-thickness 35 to be obtained and from the net volume of the fiber 21 and additional metal 22 introduced into the groove. Preferably the non-fibrous zones 23A and 23B will be arranged to be at the site of the lateral surfaces 62A and 62B of the machined part 60, which means that the layers of fibers 21 will have a width that is less than the width of the part 60 between its faces 62A and 62B, whereas the width of the groove 5 between its walls 7A and 7B is greater than the width of the part 60. With this arrangement, which is more efficient, but not essential, the part 60 will not have fibers 21 on its flanks 62A and 62B, nor will it contain the welded area between the side walls 7A and 7B and the additional metal 22. The peripheral portion 64 of the part 60 outwardly of the fibrous zone is formed by part of the blank 1.

The functional members of the part, such as blades machined from the mass, grooves for holding inserted blades, and flanges for connection to other rotor stages, may be machined in the portions of the part 60 which do not have fibers 21.

It will be noted that the part 60 is shown as having a rectangular section for the purposes of convenience and to simplify the description, but the process will obviously permit a great diversity of shapes to be produced.

The blank 1, the additional metal, the over-thickness and the closure member 50 may be made of a titanium alloy such as TA6V or TA6ZR4DE, the ring 40 may be of mild steel such as Z10CNT18, and the fibers 21 may be of silicon carbide, boron carbide or any other high strength material capable of withstanding the temperatures reached.

With the exception of the expansion ring, only one metal is used so as not to contaminate the machining waste and thus permit recycling, which is important in the case of the titanium alloys used in aeronautical engineering. Other metals, such as, for example, intermetallic compounds based on titanium and aluminium, or nickel-based superalloys, can also be used, provided, of course, that they are weldable to each other under the same conditions of temperature and pressure.

Superplastic forging and welding are achievable with the above alloys in an autoclave at 95° C. and a pressure of 1100 bar. These alloys are normally forgeable at 700 bar, but overpressure at 1100 bar is required to take account of the resistance of the ring 40.

We claim:

1. A method of producing a fiber-reinforced metallic circular part having a central hollow and wherein the reinforcing fibers are arranged in said part in the vicinity of said hollow said method comprising the steps of:

a) providing an annular metallic blank having a geometric axis and containing a channel-sectioned circular groove opening towards said axis;

b) placing uncompressed concentric layers of said reinforcing fibers and additional metal in said groove, said fiber layers alternating with said additional metal layers;

c) covering said groove with a deformable closure member;

d) evacuating and hermetically sealing said groove;

e) placing the assembly consisting of said blank and said layers of fibers and additional metal sealed in said groove of said blank in an autoclave and subjecting the assembly therein to a temperature at least equal to the superplastic forging temperature of said additional metal layers and a pressure at least equal to the superplastic forging pressure of said additional metal layers such that said fiber layers and said additional metal layers are compressed together and welded to said blank by superplastic forging in a single operation; and f) machining the compressed and welded assembly resulting from step (e) to obtain the required part.

2. A method according to claim 1, further comprising the step of placing a radial expansion ring in the mouth of said groove before said step of covering said groove with a deformable closure member.

3. A method according to claim 2, wherein said radial expansion ring is made of a material which, at the superplastic forging temperature of said additional metal, has an elastic stretch limit lower than the actual stretching which said material undergoes during the compression and welding operation in step (e) and a stretch limit before breaking higher than said actual stretching during said compression and welding operation.

4. A method according to claim 3, wherein said ring slides radially between the lateral walls of said groove as said ring expands during said compression and welding operation.

5. A method according to claim 1, wherein said blank includes a flank portion which is removable to open said groove on one side thereof, and step (b) is carried out with said flank portion removed to facilitate the placement of said layers of fibers and additional metal in said groove.

6. A method according to claim 1, wherein said step of evacuating and sealing said groove comprises placing said blank with said layers of fibers and additional metal in said groove in an evacuated enclosure and electron beam welding said closure member to said blank in said evacuated enclosure.

7. A method according to claim 1, wherein the thickness of said blank 1 between the bottom of said groove and the radially outer surface of said blank is at least five times the thickness of said closure member, in order to ensure outward radial deformation of said layers of fibers and additional metal during step (e).

8. A method according to claim 1, wherein said reinforcing fibers each have a length equal to, or slightly less than, the circumference of the circle defined thereby in said groove before said compression in step (e).

9. A method according to claim 1, wherein said layers of reinforcing fibers have a width less than the width of said groove and are placed in said groove in step (b) such that non-fibrous zones are formed adjacent the sides of said groove, and wherein the lateral surface of the final part are machined in step (f) within said non-fibrous zones.

10. A method according to claim 9, wherein said non-fibrous zones formed when placing said fiber layers in said groove in step (b) are filled by placing lateral strips of additional metal in said groove alongside said fiber layers.

11. A method according to claim 1, wherein said layers of fibers and additional metal are placed in said groove in step (b) as preforms cut to length from a ribbon comprising a support formed by a sheet of said additional metal and a fabric which is applied to said support and in which fabric the warp threads thereof are formed by said reinforcing fibers.

12. A method according to claim 11, wherein said ribbon further ,comprises lateral strips of additional metal applied to said support adjacent the opposite side edges of said fabric, said lateral strips being firmly secured to said support.

13. A method according to claim 12, wherein the weft threads of said fabric have extensions at each side edge of said fabric, and said extensions are received between said support and said lateral strips.

14. A method according to claim 12, wherein said lateral strips are resistance welded to said support.

15. A method according to claim 11, wherein the cut lines of said preforms are evenly distributed around said groove.

16. A method according to claim 1, wherein step (b) includes placing an over-thickness of additional metal in said groove radially inwardly of said layers of fiber and additional metal, the thickness of said over-thickness being greater than the thickness of metal which is to remain between said reinforcing fibers and the inner surface of said part after said machining step (f).

17. A method according to claim 1, wherein said closure member placed in step (c) rests against two bearing surfaces on the inner side of said blank, each of said bearing surfaces having a width at least equal to twice the thickness of said closure member.

18. A method according to claim 17, wherein said blank defines a shoulder laterally outwardly of each of said bearing surfaces, and the edges of said closure member are welded to said shoulders when sealing said groove in step (d).

19. A method according to claim 17, wherein said bearing surfaces merge with the side walls of said groove through rounded portions having a radius which is not less than two thirds of the radial displacement of the central part of said closure member during said compression and welding operation in step (e).

20. A method according to claim 2, wherein said radial expansion ring has a radially inner surface and lateral edge surfaces which merge with said inner surface through rounded portions having a radius which is not less than the thickness of said closure member.

* * * * *